United States Patent [19]

Nakasato et al.

[11] Patent Number: 4,653,878
[45] Date of Patent: Mar. 31, 1987

[54] MICROSCOPE EQUIPPED WITH AN ELECTRIC DEVICE FOR DRIVING REVOLVER AND STAGE

[75] Inventors: Kanae Nakasato, Hachiouji; Masayuki Naito, Mitaka; Masami Kawasaki, Hachiouji, all of Japan

[73] Assignee: Olympus Optical Co., Ltd., Tokyo, Japan

[21] Appl. No.: 829,477

[22] Filed: Feb. 13, 1986

Related U.S. Application Data

[63] Continuation of Ser. No. 591,377, Mar. 20, 1984, abandoned.

[30] Foreign Application Priority Data

Mar. 22, 1983 [JP] Japan .................... 58-47645
Mar. 22, 1983 [JP] Japan .................... 58-47646

[51] Int. Cl.⁴ .................... G02B 21/00; G02B 21/26
[52] U.S. Cl. .................... 350/520; 350/507; 350/530
[58] Field of Search .................... 350/507, 518–521, 350/529–533, 559, 570, 255

[56] References Cited

U.S. PATENT DOCUMENTS

| | | | |
|---|---|---|---|
| 3,873,189 | 3/1975 | Whitaker et al. | 350/255 |
| 4,067,031 | 1/1978 | Enomoto | 350/255 |
| 4,241,251 | 12/1980 | Yonekubo | 350/526 |
| 4,364,630 | 12/1982 | Hayasaka | 350/521 |

FOREIGN PATENT DOCUMENTS

| | | | |
|---|---|---|---|
| 18611 | 2/1983 | Japan | 350/255 |
| 2121560 | 12/1983 | United Kingdom | 350/570 |

OTHER PUBLICATIONS

Benedetti et al., "'Cytocon': A Micro-Processor-Scope", Conf: Proc. IFD-IMIA (TC4) Working Conf. Rome, Italy, 6–8 Feb. 1980, pp. 127–134.
Kraft, W., "The New Accommodation Focusing Control in the Leitz HM-LUX3", Leitz Sci & Tech. Inf. (Germany) 6–1979, pp. 182–183.
Mason et al., "A Computerised Microscope Focusing Technique" Microscope Acta, 11–1976, pp. 439–448.

Primary Examiner—William H. Punter
Attorney, Agent, or Firm—Cushman, Darby & Cushman

[57] ABSTRACT

A microscope equipped with an electric device for driving a revolver and a stage, having a means capable of rotating the revolver to interchange an objective only when a stage is lowered by a constant amount, a means capable of changing the movement speed of the stage for focusing in accordance with the magnification of the objective brought into a light path, and a means capable of restoring to an original position after the stage is once lowered to a lower limit position in order to be able to focus simply and rapidly and perform securely the interchange of the objective and the like. The electric device involves a step motor and, except when the stage is being driven, the connection between the motor and the stage is released so that the stage may be easily controlled by a manual operation.

5 Claims, 9 Drawing Figures

MICROSCOPE EQUIPPED WITH AN ELECTRIC DEVICE FOR DRIVING REVOLVER AND STAGE

This is a continuation of application Ser. No. 591,377 filed Mar. 20, 1984, which was abandoned uopn the filing hereof.

BACKGROUND OF THE INVENTION (a) Field of the Invention:

The present invention relates to a microscope and, more specifically, to an electric system for driving a revolver and a stage.

(b) Description of the Prior Art:

A conventional electric microscope, for example, as shown in FIG. 1, is provided with an electric revolver 1, a plurality of objectives 2 attached to the electric revolver 1, a stage 3 for placing a sample P, an electric focusing device 4 moving the stage 3 to a vertical direction, that is, an optical axis direction and focusing by moving the sample P to the focal plane of the objective 2, a switch 5 indicating moving direction of the stage 3, and the like. Also, the electric focusing device, for example, is concretely formed by a stage moving mechanism as shown in FIG. 2 comprising a movable portion 6 fixing the stage 3 to the upper face, a movable portion guide 7 fixed to the body of the microscope and guiding the movable portion 6 to a vertical direction, that is an optical axis direction, a rotary shaft 8 pivotally mounted to the movable portion guide 7 and connected with the movable portion 6 through a rack and pinion mechanism, manually operated knobs 9 fixed to the ends of the rotary shaft 8, a gear 10 fixed to the rotary shaft 8, a motor 11 fixed to the body of the microscope, and a driving gear 12 fixed to the driving shaft of the motor 11 and engaged with the gear 10 and a stage moving control circuit as shown in FIG. 3 comprising a switch circuit 13 having the switch 5, a rotary direction controlling circuit 14 for determining the rotary direction of the motor 11 by the signal from said switch circuit 13, and a motor driving circuit 15 for rotating the motor 11 to the rotary direction indicated by the signal from the rotary direction controlling circuit 14.

By the way, as the conventional electric focusing device described above moves vertically the stage 3 at a constant speed, when observation is carried out by an objective with a low magnification, that is, an objective with a large focal depth, a moving speed is too low and it takes time to bring the sample to the focal plane. On the contrary, when observation is carried out by an objective with a high magnification, that is, an objective with a small focal depth, as a moving speed is too high and it is difficult to obtain an image, the operation can not be easily performed and consequently there is a problem that it takes time to perform a focusing work. Also, as the motor 11 and the rotary shaft 8 are always in a connected state, even when the focusing work is manually performed by using the manually operated knobs 9, the knobs 9 are tight to be very difficult of use. Furthermore, as the conventional device is formed so that the electric revolver 1 and the electric focusing device 4 are independently operated, there is danger that the sample may be damaged when the objective is changed from a low magnification to a high magnification. That is, when focusing is to be performed by the objective with a low magnification, the stage sometimes is positioned farther upward than the focal plane of the objective due to its large focal depth. In this state, if the electric revolver 1 is rotated to change to the objective with a high magnification, as an operating distance of said objective is short, the top of the objective may contact the sample P to damage it. Especially, in the case of a sample without a glass cover or a sample only putting a glass cover, the damage of the sample is fatal. In other words, the conventional electric microscope, as mentioned above, has provided nothing but the structure that the stage and the revolver are merely driven by the motor and has never taken such consideration that both the stage and the revolver are systematically controlled by being interlocked with each other or that a manual operatin can be also facilitated.

SUMMARY OF THE INVENTION

A primary object of the present invention is to provide a microscope equipped with an electric device for driving a revolver and a stage and adapted to the variety of operation, in addition to an automatic operation which can systematically move the stage and the revolver through an operation switch, capable of moving semiautomatically one of the stage and the revolver so that an operator can take his choice.

According to the present invention, the object is accomplished by providing a stage moving control circuit, a magnification detecting circuit capable of detecting the magnification of an objective, a speed controlling circuit capable of controlling the rotary speed of a motor to drive a stage moving element, a memory circuit capable of memorizing the position of a stage, a clutch capable of connecting a stage moving element with a motor, a lower limit sensor capable of detecting a lower limit position of the stage, a clutch controlling circuit capable of controlling the operation of a clutch, a click signal detecting circuit capable of detecting the stop of the rotation of a revolver, a revolver rotation controlling circuit, a switch means capable of indicating selectively the rotary direction and rotary speed of the motor, a stage position restoring switch, and a revolver operation switch.

According to the present invention, an operation requiring operator skill such as focusing wherein a sample is approached to an objective is performed readily and rapidly by the automatic operation, and the interchange of the sample and the resultant interchange of the objective are securely carried out by either automatic or manual operation.

According to a preferred formation of the present invention, after the selection of the automatic operation of the objective as mentioned below, the movement of a focusing stage is performed at a speed suitable for a focal depth based on the magnification of an objective selected to use. Focusing can be performed always rapidly and properly thereby.

According to another preferred formation of the present invention, in semiautomatic mode such as the case that the distance between the objective and the sample is maintained in the above manner and the sample is replaced with that of the same kind on the stage, a stage is lowered to lower limit position by the first signal from a stage position restoring switch and it is restored to an original position memorized through a memory circuit by the second signal from the switch. Therefore, the interchange of an objective with high magnification even in using oil for dip cleaning, and a sample and the like can be performed very easily thereby.

According to still another preferred formation of the present invention, when no signal is generated from a switch means, a clutch is in an inoperative state and the connection between a motor and a stage moving element is released. Therefore, focusing with a manual operation also can be smoothly and lightly performed.

According to yet another preferred formation of the present invention, in automatic mode with consideration even for an automatic interchange of the objective, when a revolver operation switch is operated, a stage is lowered to a predetermined distance and then a revolver is rotated and, when the revolver is rotated to a predetermined angle and one objective selectively indicated is inserted into a light path, the revolver is stopped and the stage is simultaneously raised by the above-mentioned distance to be stopped. Such an accident as a sample is damaged by the tip of the objective at the time of interchange of the objective can be securely prevented thereby.

This and other objects of the present invention will become more apparent during the course of the following detailed description and appended claims.

DESCRIPTION OF THE PREFERRED EMBODIMENTS

Figure 1:
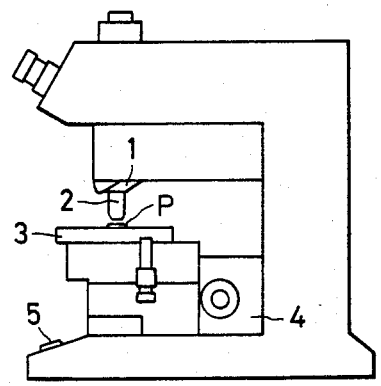
FIG. 1 is a side view of an example of a conventional microscope equipped with an electric device for driving a revolver and a stage.
Figure 2:
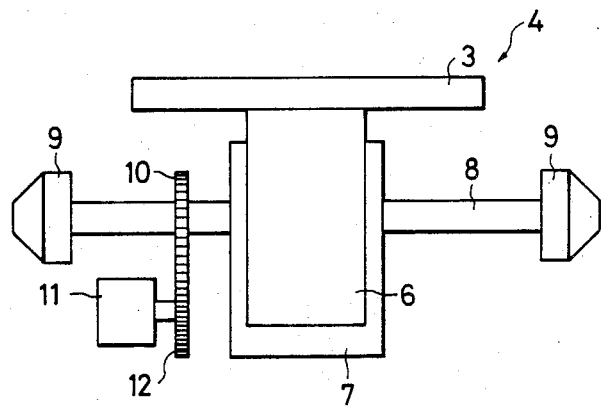
FIG. 2 is a schematic front view of a conventional stage moving mechanism portion.
Figure 3:
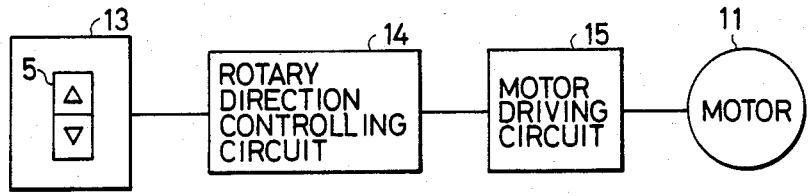
FIG. 3 is a block diagram of a conventional stage moving controlling circuit portion.
Figure 4:
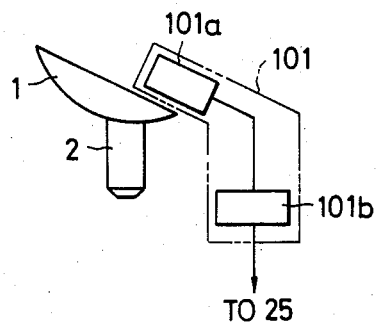
FIG. 4 is a schematic view showing an embodiment of a magnification detecting device portion of an objective in accordance with the present invention.
Figure 5:
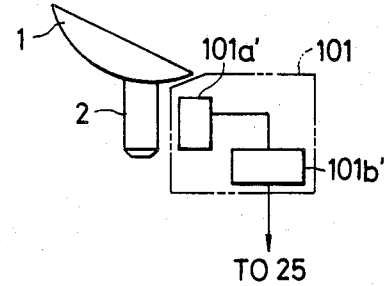
FIG. 5 is a schematic view showing another embodiment of a magnification detecting device portion of an objective in accordance with the present invention.
Figure 6:
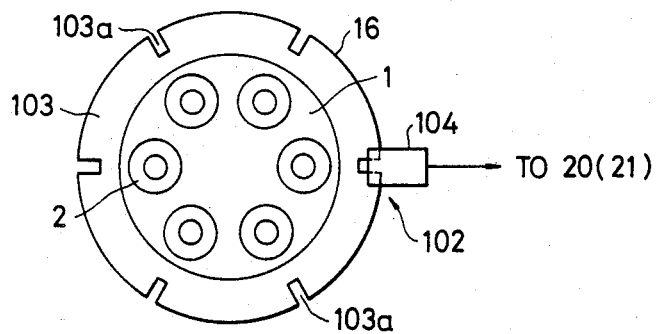
FIG. 6 is a schematic view showing an embodiment of a click signal detection portion for a revolver in accordance with the present invention.
Figure 7:
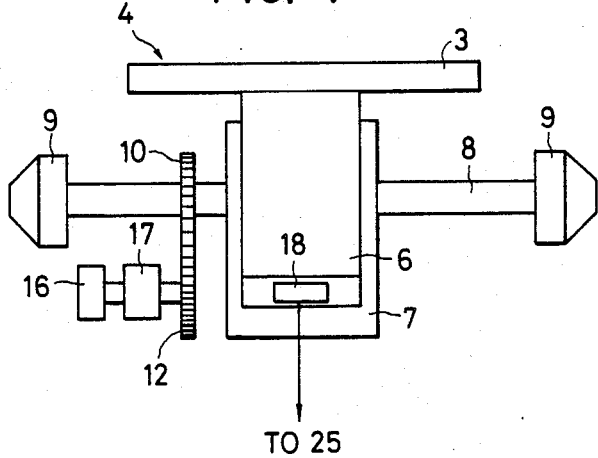
FIG. 7 is a schematic front view showing an embodiment of a stage moving mechanism portion in accordance with the present invention.
Figure 8:
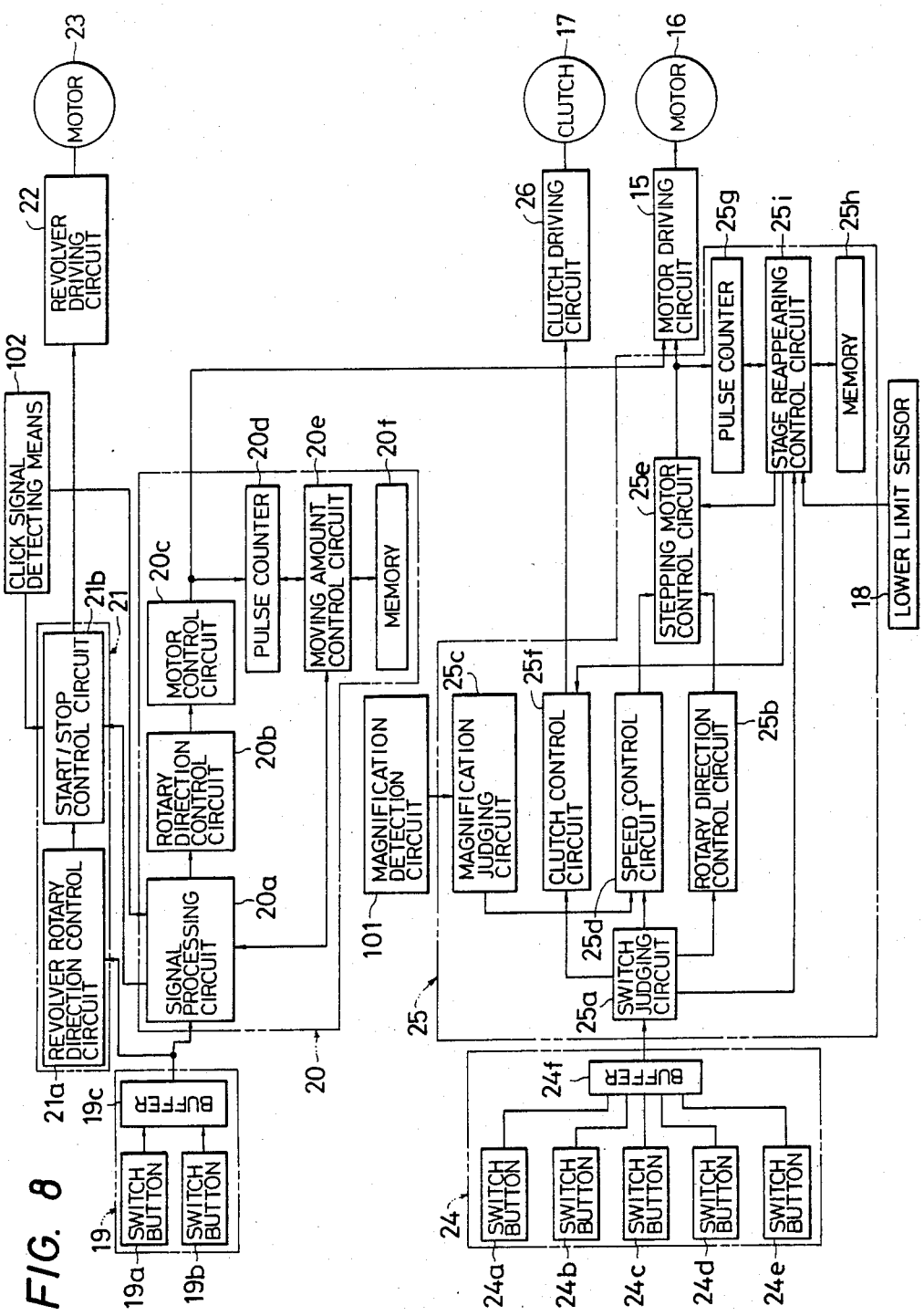
FIG. 8 is a block diagram showing an embodiment of a movement controlling circuit portion for a revolver and a stage in accordance with the present invention.

Referring to the drawings, an embodiment in accordance with the present invention will be described below by marking the same reference numerals to the same elements as those shown in FIG. 1 through FIG. 3. In FIG. 4 through FIG. 6 now, reference numeral 101 is a magnification detecting means for detecting the magnification of an objective 2 inserted into a light path and reference numeral 102 is a click signal detecting means for detecting whether a revolver 1 is being rotated or not. The magnification detecting circuit 101, as shown in FIG. 4, comprises a position detecting sensor 101a arranged adjacently to the revolver 1 and a position-magnification decoder 101b connected thereto and may be well formed so as to be able to discriminate the magnification of an objective inserted into the light path by detecting the position of an objective setting hole matching with the light path for observation through the position detecting sensor 101a and change the position information of the objective setting hole to the magnification information through the position-magnification decoder 101b to produce the magnification information of the objective inserted into the light path. Also, the circuit 101, as shown in FIG. 5, comprises an indicating detection sensor 101a' arranged adjacently to the revolver 1 and arranged so as to be able to read directly a magnification indication provided at the outside of the objective inserted into the light path and an indication-magnification decoder 101b' connected thereto and may be well formed so as to be able to change the indication information read through the indicating detection sensor 101a' to the magnification information to produce the magnification information of the objective inserted into the light path. In addition, the click signal detecting means 102, as shown in FIG. 6, comprises a slit plate 103 attached to the revolver 1 and having a plurality of slits 103a corresponding each to the positions of a plurality of clicks (for stopping the revolver 1 in a desired angular position) provided to the revolver and a photosensor 104 capable of producing a signal (referred to hereinafter as a click signal) by matching with one of the slits 103a when any of the objectives is inserted into the light path and the revolver 1 is stopped by the click. FIG. 7 shows a stage moving mechanism in accordance with the present invention. Reference numeral 16 is a step motor, 17 is an electromagnetic clutch placed between the step motor 16 and the driving gear 12, and 18 is a limit sensor arranged adjacently to the movable portion 6 and capable of producing a signal in ON-state when the movable portion 6 is brought to a lower limit position. FIG. 8 is a block diagram of a movement controlling circuit means for the revolver and stage in accordance with the present invention and reference numeral 19 is a revolver operation switch means for controlling the start and rotary direction of the revolver 1 and comprises a clockwise rotation instructing switch button 19a a counterclockwise rotation instructing switch button 19b, and a buffer 19c capable of converting the ON/-OFF state of the switch buttons to an electric signal for output. Reference numeral 20 is a stage driving control means capable of operating so as to lower the stage 3 by a predetermined distance by the signal from the revolver operation switch means 19, raising the stage to an original position by the signal from the click signal detecting means 102 and comprising a signal processing circuit 20a, a rotary detection controlling circuit 20b capable of determining the rotary direction of the motor, a motor controlling circuit 20c capable of controlling the step motor 16 through the motor driving circuit 15, a pulse counter 20d for counting the number of pulses issued from the motor controlling circuit 20c, a moving amount controlling circuit 20e capable of transmitting the signal for instructing a lowering movement stop of the stage to the signal processing circuit 20a and storing the output value of the pulse counter 20d in a memory circuit 20f when the output from the pulse counter 20d reaches a predetermined value at the time of lowering of the stage and instructing a rising movement stop of the stage to the signal processing circuit 20a when the value counted by the pulse counter 20a is compared with the above output value stored in the memory circuit 20f and the both agree at the time of raising of the stage, and a memory circuit 20f described above capable of memorizing the number of pulses from the pulse counter 20d. Reference numeral 21 is a revolver driving control means capable of operating so as to control the drive, stop, and rotary direction of the revolver 1, rotate the revolver 1 to the direction designated by the revolver operation switch means 19 through a lowering movement completion signal of the stage from the stage driving control means 20, and stop the rotation of the revolver 1 by the signal from the click signal detecting circuit 102 and comprising a revolver rotary direction control circuit 21a capable of determining the rotary direction of the revolver 1 by detecting either the clockwise rotation indicating switch button 19a or the counterclockwise rotation indicating switch button 19b is depressed by a switch information signal from the revolver operation switch means 19 and a start/stop control circuit 21b capable of controlling the start and stop of the revolver 1. Reference numeral 22 is a revolver driving circuit capable of performing the rotation and stop of a revolver driving motor 23 in accordance with the signal from the revolver driving control means 21. Reference numeral 24 is a stage operation switch means comprising a coarse by rising movement instructing switch button 24a, a coarse by lowering movement instructing switch button 24b, a fine by rising movement instructing switch button 24c, a fine by lowering movement instructing switch button 24d, a stage position restoring switch button 24e, and a buffer 24f capable of outputting by changing ON/OFF state of the above each switch button particular electric signals. Reference numeral 25 is a main stage driving control means for controlling a vertical movement and stop of the stage 3 comprising a switch judging circuit 25a capable of producing a particular electric signal corresponding to the switch button operated by judging that any switch button of the stage operation switch means 24 is pushed in accordance with the switch information signal generated from the stage operation switch means 24, a rotary direction controlling circuit 25b for determining the rotary direction of the step motor 16 by the signal from the switch judging circuit 25a, a magnification judging circuit 25c capable of determining the moving speed of the stage 3 suitable for the focal depth of the objective inserted into the light path by the magnification information signal from the magnification detecting circuit 101, a speed controlling circuit 25d capable of determining the rotary speed of the motor 16 by a signal from the magnification judging circuit 25c and a signal from the switch judging circuit 25a relating to a fine and coarse movement, a step motor controlling circuit 25e capable of determining a pulse width and phase of the driving pulse to be issued to the step motor 16 through the motor driving circuit 15 on the basis of signals generated from the rotary direction control circuit 25b and the speed controlling circuit 25d, a clutch controlling circuit 25f capable of changing the electromagnetic clutch 17 to an operative state or inoperative state through a clutch driving circuit 26 on the basis of a switch ON/OFF signal (signal discriminating that any of the switch buttons 24a through 24e is depressed or no switch button is depressed) generated from the switch judging circuit 25a, a pulse counter 25g for counting the number of pulses issued from the step motor controlling circuit 25e, a memory circuit 25h capable of memorizing the position of the stage 3 by the number of pulses counted, and a stage restoring control circuit 25i operating so as to lower the stage 3 by a signal to be issued from the switch judging circuit 25a through the first operation of the stage restoring switch button 24e, in order to stop a lowering movement of the stage 3 in accordance with a signal generated from the lower limit sensor 18 when the stage 3 reaches a lower limit position, simultaneously read the number of pulses issued from the step motor controlling circuit 25e until the stop of the stage 3, the memory circuit 25h from the pulse counter 25g, and read out the number of pulses memorized from the memory circuit 25h by a signal to be issued from the switch judging circuit 25a through the second operation of the stage restoring switch 24e to raise the stage 3 for the number of pulses to be read out.

Next, the action of the above device shall be described.

Figure 9:
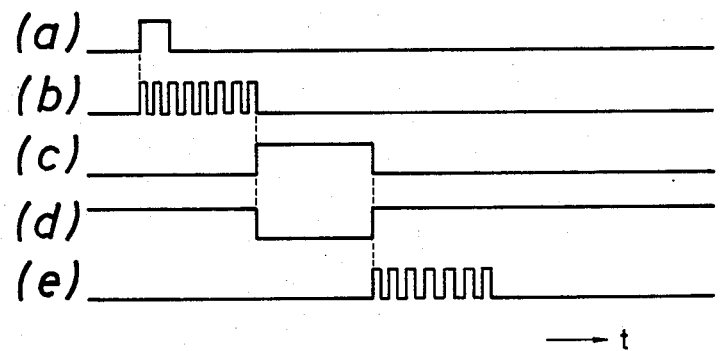
FIG. 9 is a chart showing a time schedule of a controlling operation.

Referring now to FIG. 9, the control of automatic mode including the interchange of the revolver will be described. When any of the switch buttons 19a and 19b in the revolver operation switch means 19 is depressed, a signal (a) particular to the switch button depressed is issued from the buffer 19c and is supplied to the stage driving control means 20 and the revolver driving control means 21. The stage driving control means 20 supplys the desired number of pulse signals (b) to the motor driving circuit 15 by the input of the signal (a) to rotate the step motor 16 and the stage 3 stops after it is lowered by a predetermined distance. At the moment the stage 3 stops, a signal (c) is supplied to the revolver driving control means 21 from the stage driving control means 20 and the revolver 1 is rotated in a designated direction by the switch button depressed to change the objective. Thus, when the changeover of the objective is completed, a click signal (d) is supplied to the revolver driving control means 21 from the click signal detecting means 102 and consequently the revolver driving motor 23 is stopped and the revolver 1 is stopped at the position in which the objective 2 matches with the light path by a click device not illustrated. On the other hand, the click signal (d) is also supplied to the stage driving control means 20. The step motor is started again by the input of the click signal (d) to the stage driving control means 20 to raise the stage 3. In this case, as the stage 3 is raised by the number of pulses equal to those of lowering, it is restored in high accuracy to the original position. As mentioned above, when the objective is to be changed over, the objective to be changed over is inserted into the light path after the stage is once lowered and, when the objective is brought to a correctly inserted position, the stage 3 is restored to the original position. Therefore, the stage 3 will not be unexpectedly brought to a higher position and the sample may be not damaged by the tip of the objective. Also, as the drive of the stage 3 is performed by the step motor, the position control of the stage is only necessary to the control of the number of pulses, which is an embodiment that the feedback from the position detector is not required, and is executed by an open loop control and can be controlled in high accuracy and programmably in the setting of the moving distance.

Next, the control of semiautomatic mode, that is, the control of the stage 3 for focusing, the use of oil for dip cleaning of an objective with high magnification, the replacement of a sample and the like will be described. The control for focusing will be first explained. The main stage driving control means 25 determines a coarse movement speed (comparatively high speed) and a fine movement speed (comparatively low speed) suitable for the focal depth of the objective when the magnification information of the objective inserted into the light path is supplied from the magnification detecting means 101. First, when either of the switch buttons 24a and 24b is depressed, the control means 25 sets the clutch 17 to an operative state to connect the motor 16 to the driving gear 12 and moves the stage 3 to the position capable of catching roughly an image by driving the motor 16 to a designated direction at a coarse movement speed determined. Next, when either of the switch buttons 24c and 24d is deprssed, the control means 25 drives the step motor 16 to a designated direction at a fine movement speed previously determined to move the stage 3 to a focus position. Then, when the depression of the switch button is released by completing the focusing, as the output from the switch means 24 is eliminated, the control means 25 stops the step motor 16 and changes the clutch 17 to an inoperative state. The focusing is performed as mentioned above and, as the movement of the stage 3 is performed at a speed suitable for the focal depth in each magnification of objectives, the focusing work can be easily and speedily executed.

Next, when the stage position restoring switch 24c is once depressed, the control means 25 sets the clutch 17 to an operative state and, in succession, drives the step motor 16 at the maximum speed to lower the stage 3. When the stage 3 reaches the lower limit position and the signal is issued from the lower limit sensor 18, the control means 25 stops the step motor 16 and simultaneously memorizes the number of pulses supplied to the motor driving cicuit 15 in the memory circuit 25h and does not receive any signal except the stage operation switch means 24 until the stage position restoring switch 24e is depressed again. Thus, when the stage position restoring switch 24e is depressed again, the control means 25 drives the step motor 16 to the inverse direction at the maximum speed to raise the stage 3. And, when the number of pulses equal to those previously memorized in the memory circuit 25h is supplied to the motor driving circuit 15, said input to the motor driving circuit 15 is stopped, the step motor 16 is stopped, and the clutch 17 is set to an inoperative state. Thus, the stage 3 is lowered to the lower limit position by the first operation of the stage position restoring switch 24e and will be accurately restored to the original position by the second operation. A series of operations is advantageous in the use of oil for dip cleaning for an objective with high magnification and the replacement of the sample. That is, in case oil for dip cleaning is used for an objective with high magnification, after focusing is previously performed with another objective being in parfocality, as the stage 3 is accurately restored to the original position by depressing once the stage restoring switch 24c to lower the stage 3 to the lower limit, changing the objective, applying dip oil, and depressing again the stage restoring switch 24c, only the error of the both may be corrected for focusing and, therefore the focusing in high magnification difficult until now will be extremely facilitated. Also, even when the dip oil is wiped, as the same operation may be performed, the focusing in other magnification will be also facilitated. In the replacement of samples with the almost same thickness, as the stage 3 is restored to the position capable of catching roughly the image by replacing the sample in the state lowering the stage 3 to the lower limit position through the first operation of the stage position restoring switch 24e and performing again the operation of the stage position restoring switch 24e, even in this case, the focusing work is facilitated.

Also, as will be clear from the above explanation, as the clutch 17 is in the inoperative state when the signal from the stage operation switch means 24 is eliminated, the manually operated knob 9 is in a state disconnected from the step motor 16. Therefore, even when the focusing is manually performed, the operation is easy.

Also, the pulse counter 20d, the moving amount controlling circuit 20e, and the memory circuit 20f of the stage driving control means 21 may be used as the pulse counter 25g the stage restoring controlling circuit 25i, and the memory circuit 25h of the stage driving control means 25.

We claim:

1. A microscope comprising a stage, a stage driving device connected to said stage and capable of being driven by a motor to move said stage, a first stage driving control means connected to said motor and including therein a first memory means capable of memorizing the position of said stage, and a stage operation switch means connected to said first stage driving control means and including therein a stage position restoring switch, said stage being lowered to a predetermined lower position through said stage driving device and first stage driving control means when said stage position restoring switch is operated, an original position of the stage being memorized by said first memory means, and said stage being restored to said original position memorized by said first memory means through said stage driving device and first stage driving control means through said stage driving device and first stage driving control means when said stage position restoring switch is again operated.

2. A microscope according to claim 1, in which said microscope further comprises a magnification detecting means for detecting the magnification of an objective brought into the light path for use, said stage operation switch means further comprising at least one of a rising movement instruction switch means and a lowering movement instruction switch means, and wherein said stage is moved to focus at a speed suitable for depth of field of said objective detected by said magnification detecting means when said rising movement instruction switch means or said lowering movement instruction switch means are operated.

3. A microscope according to claim 2, in which said rising movement instruction switch means comprises a coarse rising movement instruction switch and a fine rising movement instruction switch, and said lowering movement instruction switch means comprises a coarse lowering movement instruction switch and a fine lowering movement instruction switch.

4. A microscope according to claim 1, in which said stage driving device includes a manually operable knob operatively connected to said stage, said microscope further comprises a clutch means arranged between said stage driving device and motor and capable of connecting said stage driving device to said motor and connected to said first stage driving control means, and said clutch means is held in an inoperative state to disconnect said stage driving device from said motor and to enable to move said stage by said manually operable knob when said stage operation switch means is not operated.

5. A microscope according to claim 1, in which said microscope further comprises a second stage driving control means to said motor and including therein a second memory means capable of memorizing the position of said stage, a revolver operation switch means connected to said second stage driving control means, a click signal detecting means connected to said second stage driving control means and detecting the stop of the rotation of a revolver, and a revolver driving control means connected to said revolver operation switch means and second stage driving control means and click signal detecting means, whereby the stage is lowered by a predetermined distance through said second stage driving control means and stage driving device by a signal to be issued when said revolver operation switch means is operated, said predetermined distance is memorized by said second memory means, the revolver is rotated by a signal to be issued from said second stage driving control means when the stage has been lowered by said distance, and is stopped by a signal to be issued from said click signal detecting means, and the stage is raised by said predetermined distance memorized by said second memory means through said second stage driving control means and stage driving device when said click signal detecting means issues a signal to stop said revolver.

* * * * *